United States Patent
Chandran et al.

(10) Patent No.: US 8,914,205 B2
(45) Date of Patent: Dec. 16, 2014

(54) SYSTEM AND METHOD FOR TRANSMITTING HELICOPTER HEALTH AND LOCATION

(71) Applicant: Honeywell International Inc., Morristown, NJ (US)

(72) Inventors: Nagarajan Chandran, Karnataka (IN); Vidhyashankaran Ramamoorthy Iyer, Karnataka (IN); Kanniganti Venkata Ramana, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 41 days.

(21) Appl. No.: 13/751,279

(22) Filed: Jan. 28, 2013

(65) Prior Publication Data
US 2014/0214286 A1 Jul. 31, 2014

(51) Int. Cl.
*G06F 17/00* (2006.01)
*G08G 5/00* (2006.01)
*G05B 23/02* (2006.01)

(52) U.S. Cl.
CPC .............. *G06F 17/00* (2013.01); *G08G 5/0013* (2013.01); *G05B 23/0283* (2013.01)
USPC ............................... 701/51; 701/31.4; 701/99

(58) Field of Classification Search
CPC . G05B 23/0283; G05B 23/0254; G06F 17/00
USPC .............................................. 701/51, 31.4, 99
See application file for complete search history.

(56) References Cited

U.S. PATENT DOCUMENTS

| | | | | |
|---|---|---|---|---|
| 5,239,468 | A * | 8/1993 | Sewersky et al. | 701/31.9 |
| 5,352,090 | A * | 10/1994 | Churchill et al. | 416/61 |
| 7,801,695 | B2 * | 9/2010 | Moeckly et al. | 702/104 |
| 7,983,809 | B2 * | 7/2011 | Kell et al. | 701/29.3 |
| 8,106,753 | B2 * | 1/2012 | Vian et al. | 340/438 |
| 8,321,118 | B2 * | 11/2012 | Moeckly et al. | 701/99 |
| 8,417,410 | B2 * | 4/2013 | Moeckly et al. | 701/29.1 |
| 8,682,509 | B2 * | 3/2014 | Goodrich et al. | 701/14 |
| 2004/0008253 | A1 * | 1/2004 | Monroe | 348/143 |
| 2004/0249521 | A1 * | 12/2004 | Petersen et al. | 701/3 |
| 2006/0069520 | A1 | 3/2006 | Gorinevsky et al. | |
| 2007/0050104 | A1 | 3/2007 | Wallace et al. | |
| 2007/0260726 | A1 | 11/2007 | Rozak et al. | |
| 2008/0319603 | A1 | 12/2008 | Bishop et al. | |
| 2010/0042283 | A1 * | 2/2010 | Kell et al. | 701/29 |
| 2010/0052948 | A1 * | 3/2010 | Vian et al. | 340/963 |

(Continued)

OTHER PUBLICATIONS

Friend, S. et al.: SH-60B HUMS Experience Using a Satellite Data Link, IEEEAC paper #1176, Version 8, Updated Dec. 9, 2004.

(Continued)

*Primary Examiner* — Mary Cheung
*Assistant Examiner* — Frederick Brushaber
(74) *Attorney, Agent, or Firm* — Ingrassia Fisher & Lorenz, P.C.

(57) ABSTRACT

A system and method combines integrated system health usage monitoring and flight tracking of a helicopter, and transmits the information to monitoring sites for managing flight operations in real time, thereby providing the functionality of both system health and flight tracking and reducing weight related constraints faced by helicopters. With enhanced availability of system health data, vital information for maintenance and flight position data-stream, operations, flight dispatch and maintenance can plan for required services more efficiently.

20 Claims, 3 Drawing Sheets

(56) References Cited

U.S. PATENT DOCUMENTS

| | | | |
|---|---|---|---|
| 2010/0161154 A1* | 6/2010 | Moeckly et al. | 701/3 |
| 2010/0161196 A1* | 6/2010 | Goericke et al. | 701/99 |
| 2010/0161197 A1* | 6/2010 | Moeckly et al. | 701/99 |
| 2010/0161247 A1* | 6/2010 | Moeckly et al. | 702/41 |
| 2011/0054721 A1* | 3/2011 | Goodrich et al. | 701/14 |
| 2011/0166798 A1* | 7/2011 | Knodel et al. | 702/34 |
| 2012/0065901 A1* | 3/2012 | Bechhoefer et al. | 702/34 |
| 2012/0221193 A1* | 8/2012 | Delaye et al. | 701/31.9 |
| 2012/0283963 A1* | 11/2012 | Mitchell et al. | 702/34 |

OTHER PUBLICATIONS

Sikorsky S-76D, Multi-Mission Helicopter, Rugged dependability for your most demanding missions; Sikorsky S-76; A Heritage of Trust: S-76D Helicopter Performance, Reliability, Capacity.

Meggitt PLC; Meggitt Moves into Real Time Flight Data Transmission; [http://www.meggitt.com/?OBH=316&ID=79] 10/23/201.

EP Communication for EP 14151010.7-1810 dated May 28, 2014.

EP Search Report for EP 14151010.7-1810 dated May 16, 2014.

* cited by examiner

SYSTEM AND METHOD FOR TRANSMITTING HELICOPTER HEALTH AND LOCATION

TECHNICAL FIELD

The exemplary embodiments described herein generally relates to helicopter safety and more particularly to monitoring the health status of dispatched aircraft with regard to a flight plan.

BACKGROUND

Rotary wing aircrafts are favored over fixed wing aircraft as a potential solution for many flight applications, for example, the oil and gas industry wherein workers are transported for long distances in very difficult weather conditions. As additional applications in a complicated operating environment are discovered, ensuring safe operations and reliable completion of the mission becomes more difficult. Traditional maintenance methodologies do not address the need of conducting highly reliable missions, since in many cases, the helicopters are away from their home airfield, and the maintenance provided there, for a longer duration. In other application scenarios, for example, emergency medical service where it is highly important to know the location of the helicopters so that required preparation can be made at the locations in terms of arranging the medical equipment facilities and similar other needs on a timely manner. It is required to have continued situational awareness and communication with the crew, it is also significantly important for the flight dispatchers to know and be continuously aware of their fleet locations to plan for any change in mission profile, including rerouting of flight paths and alternate landings, with the complete understanding of flight position and tracking.

Known solutions provide usage of minimum onboard health oriented data collection and monitoring where most of the analysis has to be done on the ground subsequent to the helicopters arriving back at their home base. These systems pose significant constraints to the maintenance personnel as they have to plan for alternative fleet arrangement.

Accordingly, it is desirable to provide a single system for monitoring health usage and flight tracking, and transmit critical health related information to an operations or maintenance center so adequate preparations can be made for the incoming flight, and planning can be made for effective use of the fleet of helicopters. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A system and method are provided for determining the health status of dispatched aircraft with regard to a planned flight itinerary.

A first exemplary embodiment is a method of monitoring health and itinerary of an aircraft, comprising monitoring the health of a system on the aircraft; tracking the location of the aircraft; correlating the health and location; and transmitting the correlated health and location to a managing site.

A second exemplary embodiment is a method of monitoring health and itinerary of a helicopter, comprising determining the health of at least one helicopter component; determining current flight parameters of the helicopter; correlating the health and the current flight parameters; and transmitting the correlated health and current flight parameters for analysis by a monitoring station.

A third exemplary embodiment is a system for monitoring the health, and the location, of a helicopter, the system comprising a monitoring device configured to monitor the health of a system on the helicopter; determine the location of the helicopter; and correlate the health and location; and a data link coupled to the monitoring system and configured to transmit the correlated health and location to a ground site.

BRIEF DESCRIPTION OF THE DRAWINGS

The present invention will hereinafter be described in conjunction with the following drawing figures, wherein like numerals denote like elements.

DETAILED DESCRIPTION

Figure 1:
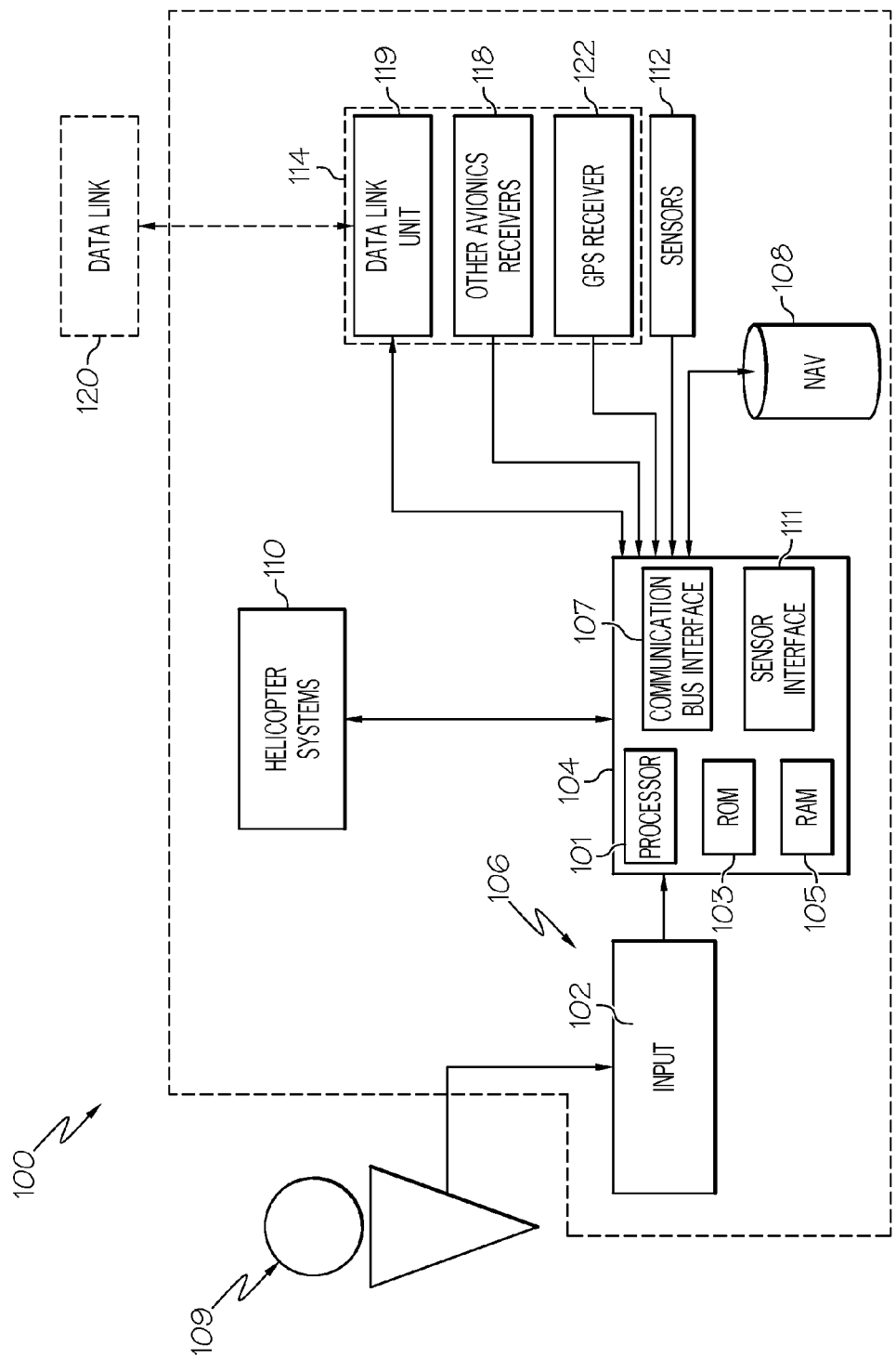
FIG. 1 is a block diagram of helicopter systems in accordance with a preferred exemplary embodiment.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The system described herein combines integrated system health usage monitoring and flight tracking of a helicopter, and transmits the information to monitoring sites for managing flight operations in real time, thereby providing the functionality of both system health and flight tracking and reducing weight related constraints faced by helicopters. The system monitors vibration of a helicopter system, and preferably a plurality of helicopter systems on a nose-to-tail basis, along with the health of engines and other critical systems that are onboard the helicopter. In conjunction with health monitoring, there is optionally usage monitoring where typical usage patterns of the aircraft systems are tracked so that any remaining useful life computations, for example, mean time between failure, can be determined and it also enables the trending of systems, sub-systems and components performance over the period of time for the individual helicopter and also across the operators' fleet. The health and usage monitoring system enhances the safety of the helicopter operation by continuously monitoring health of safety critical systems on the helicopters and the operators of the system can configure the limits that define the safety boundary of operation based on their usage needs, trends and mission profile.

Once the data is received by maintenance personnel, for example, a ground based operation, health and location correlation is performed by integrating the location information with the received health status. For example, if there is a drop in engine performance and the location of the aircraft operation indicates a low density and humid desert area, then it gives more valuable insights and reasonable justification to why there was a drop in the engine performance. Likewise, any anomalies that were reported can be traced back through the flight operational, thereby providing a cross-correlation on real health issues versus temporary issues that emerge from challenging flight operational conditions.

The following list of exemplary critical health monitoring functions is not all inclusive, as additional health monitoring functions can be added and configured easily.

Engine performance monitoring (health indication test based on pilot's command or automatic triggering based on flight regime recognition)

Engine power assurance check (available power computation and operational temperature margins)

Engine usage monitoring (low and high cycle fatigue damages of critical rotation components)

Vibration monitoring (both main and tail rotor systems, transmissions, shafts, bearings, and engines including a gas generator, power turbine, and accessory components)

Rotor track and balancing

Each helicopter will have its own operational characteristics, for example, the vibration signature of one helicopter will be unique to its built configuration. Health indications are derived from condition indicators, which are determined based on threshold evaluation during the helicopter operational signature analysis. The threshold values are then optimized through various analysis techniques and airframe level study to determine what is the best value that indicates health status of systems and components and what values are indications of developing issue within the systems that could affect continued safe flight.

While the preferred embodiment describes the monitoring of helicopter systems, other embodiments may be utilized to perform similar monitoring procedures for aircraft other than helicopters. Moreover, the techniques and technologies described herein could also be used to monitor non-aircraft vehicle systems.

The health usage and monitoring aspect of the exemplary embodiments works on a condition indicators based approach where the condition indicators are defined for the systems and components to address the various states of health and provided to the maintenance assessment (typically ground based) as a system health These condition indicators are configured with the help of ground based software which helps to continuously define, refine, and enhance the limits for the indicators, thereby ensuring continuous safety of the helicopter.

Condition indicators are health aggregates that are identified for each system, sub-system, components that reflects the actual health condition witnessed in operation. For example, a main gearbox and an engine gearbox are identified with condition indicators that give three levels of indication: caution, advisory, and good. These sorts of indications help the maintenance crew to quickly make a comprehension on the health status of the systems and its components and then plan for required maintenance actions.

In addition to the health monitoring and usage aspects described above, continuous flight tracking is enabled, for example, via a satellite, and enables the ground based monitoring to be continuously aware and appraised of the position of the helicopters. The flight tracking is performed, for example, on the Iridium Satellite network; however, other service operators would suffice as well. The position information from the flight tracking system typically is made available to the operator of the ground based monitoring station as an integral part of the ground based software tool that enables the health monitoring and usage system configuration and data analysis. Secure web-based geographic information system (GIS) mapping service provides visibility to all the tracked aircrafts under the operators' fleet. Examples of the parameters included as part of flight tracking data stream include:

Helicopter identification
Helicopter status
Emergency conditions
Coordinate location
Report date & time
Helicopter ground speed
Helicopter track
GPS signal quality and fix type Flight tracking intervals are configurable from the ground based software tool and other configuration changes like the parameters that need to be added to the parameters monitoring list and their frequency of monitoring when required.

The data to be monitored in-flight is completely automatic, although a pilot could ask for manual data acquisition in circumstances such as a maintenance flight or in emergency situations. An onboard warning may be provided for critical failures or if thresholds observed in-flight are exceeded. Flight regime recognition and automatic health assessment correlate health data with flight tracking to provide a more effective overall health assessment. Actual load cycle information results are improved by optionally considering a remaining useful life computation perspective compared to flight operational hours. The load cycle computation results in an accurate remaining useful life determination.

Remaining useful life is a very important metric in the maintenance function as it helps to determine the time of replacement of components. For example, if an engine turbine blade is slated for 2000 hours of operational life, then it is very essential to track its hours of operation and replace it at the required time to avoid any failures. The relatively close prediction of remaining useful life involves data collection, consolidation of maintenance service information, fusion of flight operational data, and the combination thereof to determine the remaining useful life. The remaining useful life determines the maintenance schedule as it is critical factor in deciding continued airworthiness of the airframe and the systems.

Location information is very vital in determination of the remaining useful life. If the operation of the helicopter is always based out of a desert climate where there is lot of dust and a hot operating environment, then the life of components will be much lesser than the design life. Likewise, if the operation is always around a sea, then corrosion can dramatically reduce the useful life of systems and its components. Hence, it is very essential to understand the location information to make sure the remaining useful life computations are true reflection of real operating condition. In summary, health and the remaining useful life are two essential elements that are to be considered for enhancement of flight safety and operational economics.

By combining the advantage of health usage monitoring and flight tracking, enhanced safe operation and mission readiness of the helicopters is improved. With enhanced availability of system health data, vital information for maintenance and flight position data-stream, flight dispatch and maintenance can plan for required services more efficiently. For example, the monitoring provides the current health and flight plan of the helicopter systems, allowing the monitoring function to determine whether there will be any health issues prior to the helicopter arriving back at home base, and allowing for scheduling of maintenance at the appropriate times during a plurality of sorties. Having these two solutions combined into one avionics system additionally provides comprehensive weight savings to the operators, thereby avoiding a compromise to their mission capabilities and revenue service.

The real world transmitted data would be a combination of alphanumeric and Boolean codes. For example, health information could be transmitted in the form of fault and symptom codes which can be translated back in the ground to understand their real values. It is also required to have some Boolean codes which indicate the presence and absence of certain health issues. For location or flight tracking the information is more of numbers and codes that represent the unique location or position information.

Referring to FIG. 1, an exemplary helicopter system 100 including a health monitor and flight tracking system 104 is depicted. The helicopter system 100 also includes a crew interface 106, one or more navigation databases 108, various sensors 112, for example, accelerometers and tachometers, and various external data sources 114. In a preferred embodiment, the crew interface 102 includes an input device 102, for example, a touch pad. The crew interface 102 is in operable communication with the health monitor and flight tracking system 104 and is configured to receive input from a user 109 (e.g., a pilot) and, in response to the user input, supply command signals to the health monitor and flight tracking system 104. The user interface 102 may be any one, or combination, of various known user interface devices including, but not limited to, a cursor control device (CCD), such as a mouse, a trackball, or joystick, and/or a keyboard, one or more buttons, switches, or knobs.

The health monitor and flight tracking system 104 may include any one of numerous known general-purpose components including a microprocessor 101 or an application specific processor that operates in response to program instructions. In the depicted embodiment, the health monitor and flight tracking system 104 further includes on-board RAM (random access memory) 103, on-board ROM (read only memory) 105, a communication bus interface 107 for data acquisition, and a sensor interface 111 for communicating with the sensors 112. The program instructions that control the health monitor and flight tracking system 104 may be stored in either or both the RAM 103 and the ROM 105. For example, the operating system software may be stored in the ROM 105, whereas various operating mode software routines, system configuration information that identifies the parameters to be monitoring, flight tracking intervals and other configuration settings, and various operational parameters may be stored in the RAM 103. It will be appreciated that this is merely exemplary of one scheme for storing operating system software and software routines, and that various other storage schemes may be implemented. It will also be appreciated that the health monitor and flight tracking system 104 may be implemented using various other circuits, not just a programmable processor. For example, digital logic circuits and analog signal processing circuits could also be used.

No matter how the health monitor and flight tracking system 104 is specifically implemented, it is in operable communication with the navigation databases 108, and is coupled to receive various types of inertial data from the various sensors 112, and various other avionics-related data from the external data sources 114. The health monitor and flight tracking system 104 responds to the inertial data and the avionics-related data to selectively retrieve navigation data from one or more of the navigation databases 108.

The navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the navigation databases 108 are, for clarity and convenience, shown as being stored separate from the health monitor and flight tracking system 104, all or portions of either or both of these databases 108 could be loaded into the RAM 103, or integrally formed as part of the health monitor and flight tracking system 104, and/or RAM 103, and/or ROM 105. The navigation databases 108 could also be part of a device or system that is physically separate from the system 100.

The sensors 112 may be implemented using various types of inertial sensors, systems, and or subsystems, now known or developed in the future, for supplying various types of inertial data. The inertial data may also vary, but preferably include data representative of the state of the aircraft such as, for example, aircraft speed, heading, altitude, and attitude. The number and type of external data sources 114 may also vary. For example, the external systems (or subsystems) may include, for example, a terrain avoidance and warning system (TAWS), a traffic and collision avoidance system (TCAS), a runway awareness and advisory system (RAAS), a flight director, and a navigation computer, just to name a few. However, for ease of description and illustration, only an onboard data link unit 119 and a global position system (GPS) receiver 122 are depicted in FIG. 1, and will now be briefly described.

The GPS receiver 122 is a multi-channel receiver, with each channel tuned to receive one or more of the GPS broadcast signals transmitted by the constellation of GPS satellites (not illustrated) orbiting the earth. Each GPS satellite encircles the earth two times each day, and the orbits are arranged so that at least four satellites are always within line of sight from almost anywhere on the earth. The GPS receiver 122, upon receipt of the GPS broadcast signals from at least three, and preferably four, or more of the GPS satellites, determines the distance between the GPS receiver 122 and the GPS satellites and the position of the GPS satellites. Based on these determinations, the GPS receiver 122, using a technique known as trilateration, determines, for example, aircraft position, groundspeed, and ground track angle. These data may be supplied to the health monitor and flight tracking system 104, which may determine aircraft glide slope deviation therefrom. Preferably, however, the GPS receiver 122 is configured to determine, and supply data representative of, aircraft glide slope deviation to the health monitor and flight tracking system 104.

Onboard data link 119 is coupled to external data link 120 and is configured to receive data from, and transmit data to, ground stations and other aircraft. Examples of the data received include, for example, helicopter systems health, location, and route changes. In accordance with the present exemplary embodiments, the onboard data link unit 119 receives, and transmits to, ADS-B information from and to the external data link 120.

The health monitor and flight tracking system 104 may include (not shown) a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration.

In an exemplary embodiment, the data link unit 119 is suitably configured to support data communication between the host aircraft and the data link 120 of one or more remote systems. More specifically, the data link unit 119 is used to transmit current flight status data and health data to the data link 120. In particular embodiments, the data link unit 119 is implemented as an aircraft-to-ground data communication module that transmits flight status data and health data.

In operation, the health monitoring and flight tracking processor 104 is also configured to process the current flight status data for the host aircraft. In this regard, the sources of flight status data generate, measure, and/or provide different types of data related to the operational status of the host aircraft, the environment in which the host aircraft is operating, flight parameters, and the like. In practice, the sources of flight status data may be realized using line replaceable units (LRUs), transducers, accelerometers, instruments, sensors, and other well known devices. The data provided by the sources of flight status data may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The health monitoring and flight tracking processor 104 is suitably designed to process data obtained from the sources of flight status data in the manner described in more detail herein. In particular, the health monitoring and flight tracking processor 104 can use the flight status data of the host aircraft when rendering the ITP display.

Figure 2:
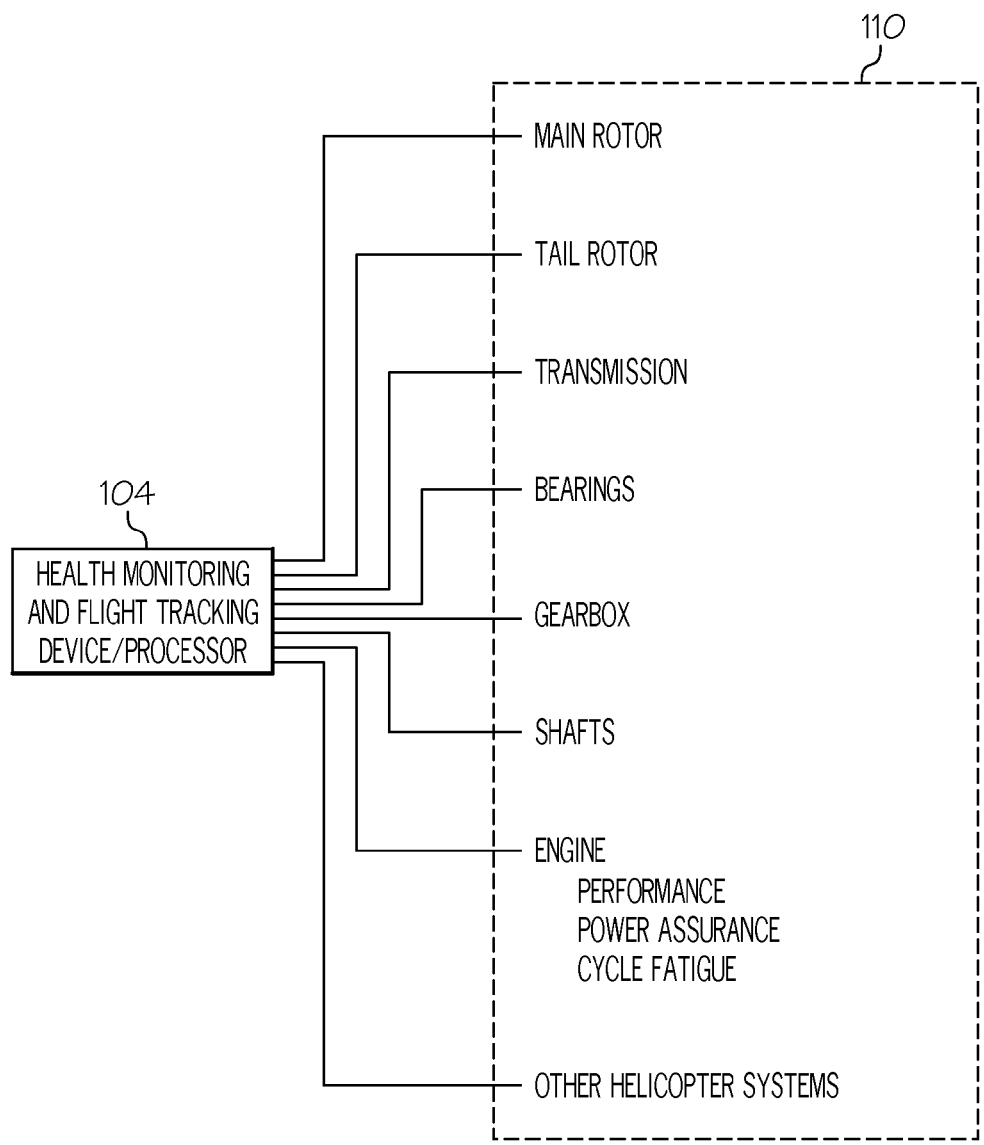
FIG. 2 is a block diagram reflecting the coupling of a health monitoring and flight tracking system to a plurality of helicopter systems in accordance with the preferred exemplary embodiment.

Referring to FIG. 2, The health monitoring and flight tracking system 104, or processor, is coupled to, and configured to monitor the health of various helicopter systems 110, including for example, a main rotor, a tail rotor, a transmission, engine performance, including power assurance, various bearings and shafts, and other helicopter systems such as the main gearbox, fuel systems, and oil and lubrication systems.

Figure 3:
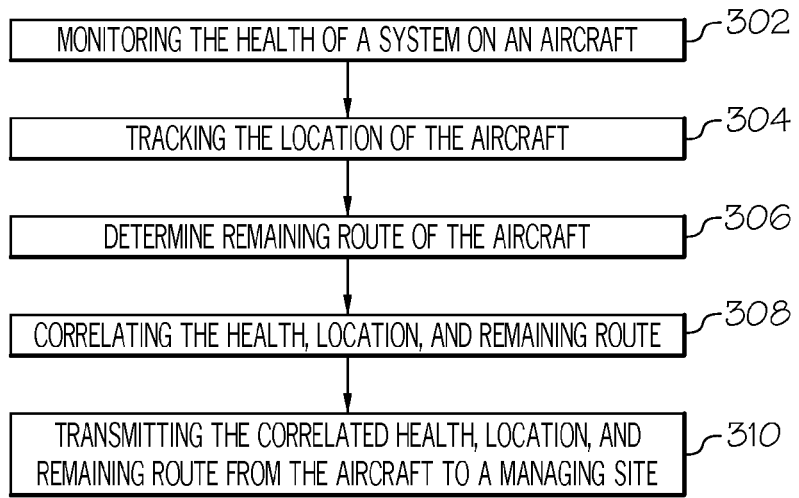
FIG. 3 is a flow chart of an exemplary embodiment of a monitoring process.
Figure 4:
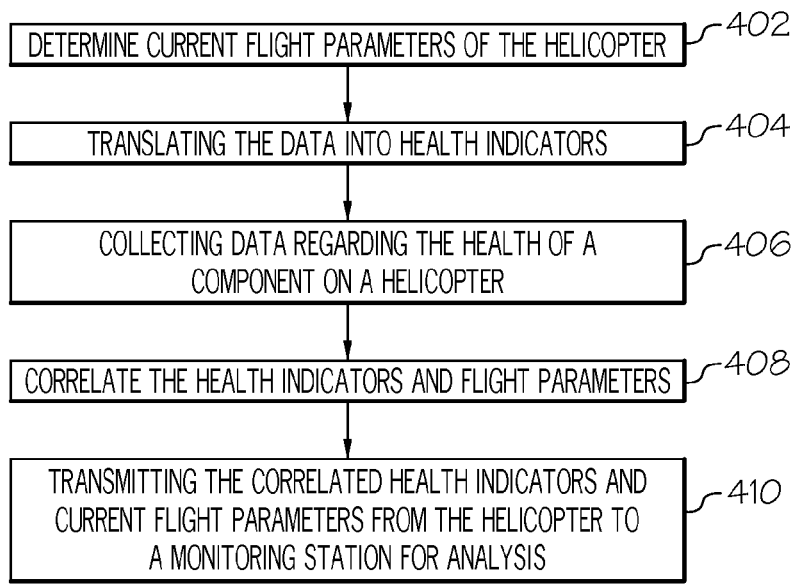
FIG. 4 is a flow chart of another exemplary embodiment of a monitoring process.

FIGS. 3 and 4 are flow charts that illustrate exemplary embodiments of a health monitor and flight tracking system 104 suitable for use with a helicopter. The various tasks performed in connection with processes 300 and 400 may be performed by software, hardware, firmware, or any combination thereof. For illustrative purposes, the following description of processes 300 and 400 may refer to elements mentioned above in connection with FIGS. 1 and 2. In practice, portions of processes 300 and 400 may be performed by different elements of the described system, e.g., a processor, a display element, or a data communication component. It should be appreciated that processes 300 and 400 may include any number of additional or alternative tasks, the tasks shown in FIGS. 3 and 4 need not be performed in the illustrated order, and processes 300 and 400 may be incorporated into a more comprehensive procedure or process having additional functionality not described in detail herein. Moreover, one or more of the tasks shown in FIGS. 3 and 4 could be omitted from an embodiment of the processes 300 and 400 as long as the intended overall functionality remains intact.

FIG. 3 depicts a first exemplary method including monitoring 302 the health of a system on an aircraft, tracking 304 the location of the aircraft, optionally determining 306 the remaining route of the aircraft, correlating 308 the health, location, and remaining route, and transmitting 310 the correlated health, location, and remaining route from the aircraft to a managing site.

FIG. 4 depicts a second exemplary method including determining 402 current flight parameters of the helicopter, translating 404 the data into health indicators, collecting 406 data regarding the health of a component on a helicopter, correlating 408 the health indicators and flight parameters, and transmitting 410 the correlated health indicators and current flight parameters from the helicopter to a monitoring station for analysis. Getting only sensor data is mere raw data that indicates, for example, only pressure, temperature information. Without translating them into a health indication of the aircraft systems, there is no real value in the sensor data. The translation process includes algorithmic conversion of raw sensor values into condition indicators by performing data reduction, filtering, neural network principles application and any predefined thresholds application.

Transmission 410 of the health indicators may be withheld until there is some exceedance of a threshold because not all health indicators are important, especially when all system states indicate a healthy status. Also, operational cost involved in transmitting 410 everything that the system produces either from a health monitoring or from flight tracking perspective is not economical. Only the essential information that is vital to make flight operational decisions are transmitted, including for example, exceedances of a threshold, flight positioning, and status information.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method of monitoring health and itinerary of a helicopter comprising:
   monitoring the health of a rotor system on the helicopter via a processor;
   tracking the location of the aircraft via the processor; correlating the health and location via the processor;
   determining if an environment of the location has an effect on the health beyond a threshold;
   comparing current health patterns versus typical health patterns;
   creating indicators related to the health, environment, and the comparison of the current health patterns versus typical health patterns; and
   transmitting the indicators and location to a managing site via a data link unit for purpose of potentially modifying flight operation of the helicopter.

2. The method of claim 1 further comprising:
   translating data acquired from the monitoring step into one of a plurality of condition indicators via the processor; and
   transmitting the data to the managing site via the data link unit.

3. The method of claim 1 wherein the monitoring, tracking, and correlating are accomplished by a single system architecture within the processor.

4. The method of claim 1 further comprising:
   transmitting via the data link unit the correlated health and location when a threshold is exceeded.

5. The method of claim 1 further comprising:
   translating the correlated health and location periodically via the processor.

6. The method of claim 1 further comprising:
   calculating a remaining useful life of the rotor system based on parametric data, condition indicators, flight conditions, and operation data via the processor; and
   transmitting the useful life to the managing site via the data link unit.

7. The method of claim 6 wherein calculating comprises:
   calculating a mean time between failures via the processor.

8. The method of claim 1 further comprising:
   determining a typical usage of the rotor system for comparison with the monitored health of the rotor system via the processor.

9. The method of claim 1 wherein the monitoring the health comprises:
   monitoring the vibration of the rotor system via the processor.

10. The method of claim 1 wherein monitoring the health further comprises monitoring an engine and a turbine.

11. The method of claim 1 further comprising: determining the remaining route of the helicopter via the processor; and the correlating step considers the remaining route.

12. A method of monitoring health and itinerary of a helicopter, comprising:
   determining the health of a rotor system of the helicopter via a processor;
   determining current flight parameters of the helicopter via the processor;
   determining if an environment of the location has an effect on the health beyond a threshold;
   comparing current health patterns versus typical health patterns;
   correlating the health and the current flight parameters via the processor;
   creating indicators related to the health, environment, and the comparison of the current health patterns versus typical health patterns; and
   transmitting the correlated health and current flight parameters for analysis by a monitoring station via a data link unit for purpose of potentially modifying flight operation of the helicopter.

13. A system for monitoring the health, and the location, of a helicopter, the system comprising:
   a monitoring device configured to:
      monitor the health of a rotor system on the helicopter;
      determine the location of the helicopter;
      correlate the health and location;
      determine if an environment of the location has an effect on the health beyond a threshold;
      compare current health patterns versus typical health patterns; and create indicators related to the health, environment, and the comparison of the current health patterns versus typical health patterns; and
   a data link coupled to the monitoring system and configured to:
      transmit the correlated health and location to a ground site for purpose of potentially modifying flight operation of the helicopter.

14. The system of claim 13 wherein:
   the monitoring device is further configured to translate data acquired from the monitoring step into one of a plurality of condition indicators; and
   the data link is further configured to transmit the data to the managing site.

15. The system of claim 13 wherein the monitoring device comprises single system architecture by consolidating health monitoring and flight tracking.

16. The system of claim 13 wherein:
   the monitoring device is further configured to calculate a remaining useful life of the rotor system; and
   the data link is further configured to transmit the useful life to the managing site.

17. The system of claim 13 wherein the monitoring device is further configured to:
   monitor the performance of the engine.

18. The system of claim 13 wherein the system comprises an engine and a transmission.

19. The system of claim 13 wherein the monitoring device is further configured to:
   determine the remaining route of the helicopter; and
   consider the remaining route.

20. The system of claim 13 wherein the monitoring device is further configured to:
   monitor systems operational margins of the helicopter including available engine power.

* * * * *